(12) United States Patent
Loghin et al.

(10) Patent No.: US 12,308,916 B2
(45) Date of Patent: *May 20, 2025

(54) COMMUNICATION DEVICES AND METHODS

(71) Applicant: Sony Group Corporation, Tokyo (JP)

(72) Inventors: Nabil Sven Loghin, Stuttgart (DE); Felix Fellhauer, Stuttgart (DE); Dana Ciochina, Stuttgart (DE); Daniel Schneider, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,889

(22) Filed: Mar. 15, 2024

(65) Prior Publication Data

US 2024/0267099 A1    Aug. 8, 2024

Related U.S. Application Data

(63) Continuation of application No. 17/630,919, filed as application No. PCT/EP2020/072167 on Aug. 6, 2020, now Pat. No. 11,984,952.

(30) Foreign Application Priority Data

Aug. 6, 2019 (EP) .................................. 19190315

(51) Int. Cl.
H04B 7/06 (2006.01)
(52) U.S. Cl.
CPC ......... *H04B 7/0617* (2013.01); *H04B 7/0695* (2013.01)

(58) Field of Classification Search
CPC ................ H04B 7/0617; H04B 7/0695; H04B 2001/3866; H04W 64/006; H04W 4/02
See application file for complete search history.

(56) References Cited

U.S. PATENT DOCUMENTS

2005/0221829 A1* 10/2005 Nishida ................... G01S 11/06
                                                                        455/440
2017/0118656 A1    4/2017 Xin et al.
(Continued)

FOREIGN PATENT DOCUMENTS

| CN | 104756424 A | 7/2015 |
|----|-------------|--------|
| CN | 109923797 A | 6/2019 |
| WO | 2018/145153 A1 | 8/2018 |

OTHER PUBLICATIONS

International Search Report and Written Opinion mailed on Sep. 23, 2020, received for PCT Application PCT/EP2020/072167, Filed on Aug. 6, 2020, 12 pages.

(Continued)

*Primary Examiner* — Aristocratis Fotakis
(74) *Attorney, Agent, or Firm* — XSENSUS, LLP

(57) ABSTRACT

To enable fast beam tracking and/or low latency a first communication device comprising a motion information circuitry configured to obtain motion information representing motion of the first communication device, a communication circuitry configured to communicate with a second communication device, and a parametrization circuitry configured to set one or more communication parameters of the communication performed by the communication circuitry based on the motion information.

19 Claims, 10 Drawing Sheets

(56) References Cited

U.S. PATENT DOCUMENTS

| | | | |
|---|---|---|---|
| 2018/0095529 A1 | 4/2018 | Tokubo | |
| 2018/0132116 A1 | 5/2018 | Shekhar et al. | |
| 2018/0234137 A1 | 8/2018 | Qu et al. | |
| 2018/0234860 A1 | 8/2018 | Kasher | |
| 2018/0324657 A1 | 11/2018 | Li et al. | |
| 2019/0068258 A1 | 2/2019 | Oteri | |
| 2019/0199467 A1 | 6/2019 | Vu | |
| 2019/0253112 A1* | 8/2019 | Raghavan | H04B 7/0695 |
| 2020/0221319 A1* | 7/2020 | Kang | H04B 7/0695 |
| 2020/0314946 A1* | 10/2020 | Tsuboi | H04W 24/10 |
| 2020/0358515 A1* | 11/2020 | Li | H04L 5/0053 |
| 2020/0395993 A1* | 12/2020 | Ryu | H04W 76/23 |
| 2021/0143887 A1* | 5/2021 | Oteri | H04B 7/0695 |
| 2022/0039081 A1* | 2/2022 | Liu | H04W 4/027 |
| 2022/0132430 A1* | 4/2022 | Hoshino | H04L 5/0051 |
| 2022/0200678 A1* | 6/2022 | Ciochina | H04B 7/0626 |
| 2022/0225118 A1* | 7/2022 | Pefkianakis | H04W 64/006 |

OTHER PUBLICATIONS

Bosch, "Small, Versatile 6DoF Sensor Module", BMI055:Data Sheet, 2014, 149 pages.

"Location Parameters Element", IEEE P802. 11-REVmc/D8.0, Aug. 2016, 1 page.

"Draft Standard for Information technology-Telecommunications and Information Exchange Between Systems Local and Metropolitan Area Networks-Specific Requirements", IEEE P802.11-REVmcTM /D8.0, Aug. 2016, 3774 pages.

"iNEMO Inertial Module: Always—on 3D Accelerometer and 3D Gyroscope", Datasheet—production data, Aug. 2017, 102 pages.

"Radio Subelement", IEEE P802. 11-REVmc/D8.0, Aug. 2016, pp. 936-937.

Ioannis Mavromatis, Andrea Tassi, Robert J. Piechocki, and Andrew Nix, "Beam Alignment for Millimetre Wave Links with Motion Prediction of Autonomous Vehicles", Department of Electrical and Electronic Engineering, University of Bristol, UK, Feb. 14, 2017. (Year: 2017).

Ioannis Mavromatis, "5G Communication Framework for Smarter Autonomous Vehicles", Department of Electrical and Electronic Engineering, University of Bristol, Thesis, Oct. 2018. (Year: 2018).

Arjan Doff, "Sensor-Assisted Movement Identification and Prediction for Beamformed 60 GHz Links", Master's Thesis in Embedded Systems, Delft University of Technology, Jan. 2015. (Year: 2015).

* cited by examiner

| Sub-element ID | Length | Linear Scale | Rotation Scale | Linear X | Linear Y | Linear Z | Rotation Pitch | Rotation Roll | Rotation Yaw | Reserved |
|---|---|---|---|---|---|---|---|---|---|---|
| 1   8 | 9   16 | 17   18 | 19   20 | 21   36 | 37   52 | 53   68 | 69   84 | 85   100 | 101   116 | 117   120 |

Bits:

Fig. 5A

| Sub-element ID | Length | Linear Scale | Rotation Scale | Linear X | Linear Y | Linear Z | Rotation Pitch | Rotation Roll | Rotation Yaw | Left eye horizontal position | Left eye vertical position | Right eye horizontal position | Right eye vertical position | Reserved |
|---|---|---|---|---|---|---|---|---|---|---|---|---|---|---|
| 1   8 | 9   16 | 17   18 | 19   20 | 21   36 | 37   52 | 53   68 | 69   84 | 85   100 | 101   116 | 117   132 | 133   148 | 149   164 | 165   180 | 181   184 |

Bits:

Fig. 5B

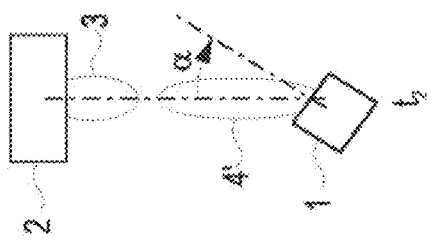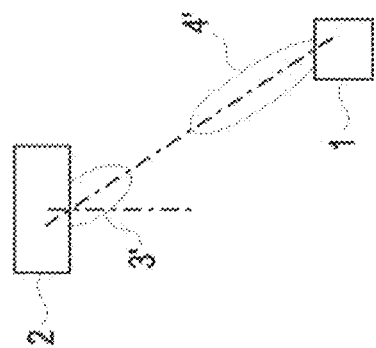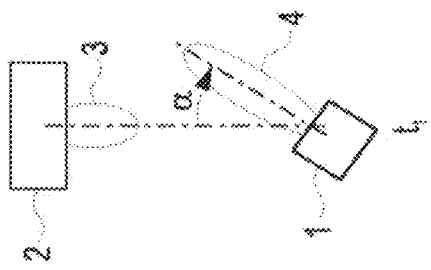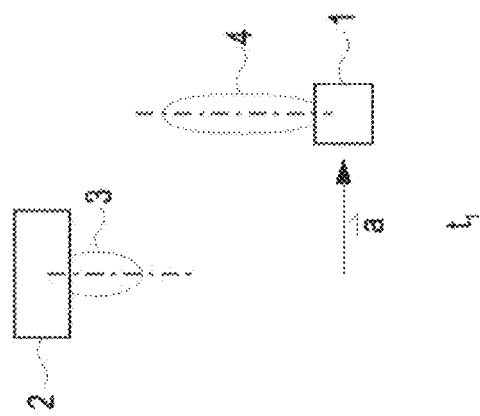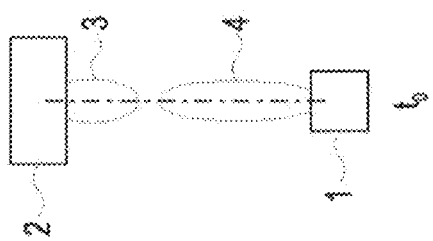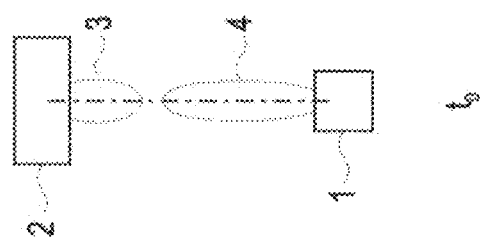

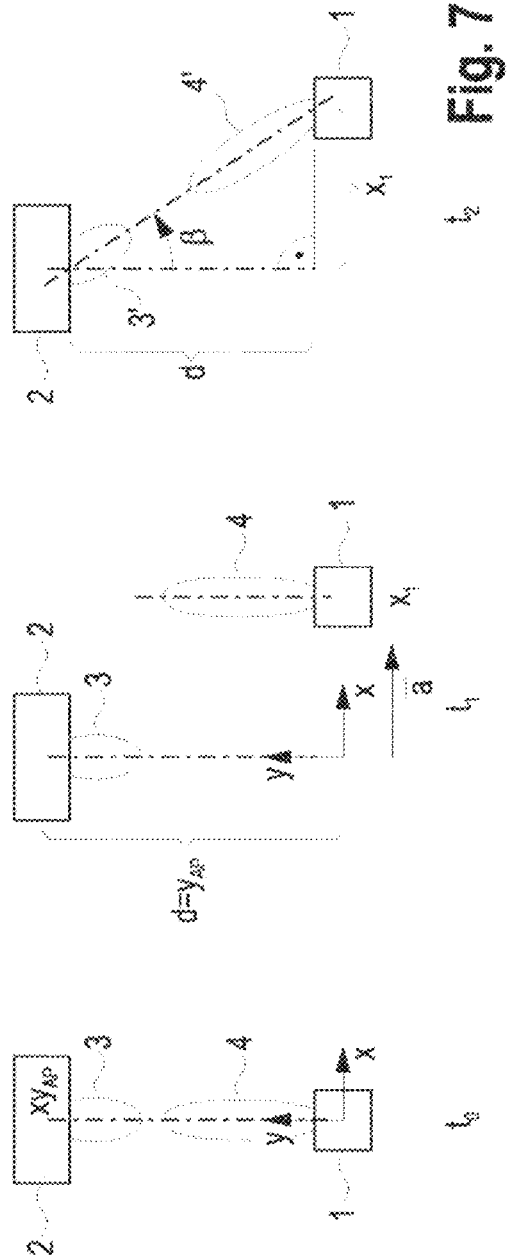

COMMUNICATION DEVICES AND METHODS

CROSS-REFERENCE TO RELATED APPLICATIONS

The present application is a continuation of U.S. application Ser. No. 17/630,919, filed Jan. 28, 2022, which is based on PCT filing PCT/EP2020/072167, filed Aug. 6, 2020, which claims priority to EP 19190315.2, filed Aug. 6, 2019, the entire contents of each are incorporated herein by reference.

FIELD OF THE DISCLOSURE

The present disclosure relates to communication devices and methods, in particular a head-mounted display and a virtual, augmented, or mixed reality device, such as a video game console.

DESCRIPTION OF RELATED ART

Wireless communication offers many advantages. For example, communication in the mmWave bands (e.g. 60 GHz for next generation WLAN systems, such as IEEE802.11ad, ay and beyond) offers large bandwidths and low latency, once the (analog) beams are established. Initial beam training and subsequent tracking for directive transmission are one of the challenges, compared with legacy bands, such as 2.4 GHz and 5 GHz, where omni-directional transmission and reception are possible. For fast moving applications such as communication between a virtual reality (VR) headset (also called head-mounted display (HMD)) and a base station or access point, this may be even more difficult. In case of a moving HMD, the initially selected transmit and receive beams may not be optimum anymore, which degrades performance, results in bit or packet errors, and can ultimately end up in a completely lost transmission link.

Virtual reality (VR) projects video on a near-eye display, usually two displays for stereoscopic depth impression, integrated into an HMD. Besides video, also immersive 3D audio is possible via speakers or headset. VR has limited or no relation to the real physical world and can display either computer generated graphics (as in gaming or simulations) or recoded 360° videos. In contrast, augmented reality (AR) enriches the real world view, e.g., highlighting interesting locations or indicating a direction for navigation purpose. Displays are usually semi-transparent and use waveguides to overlay virtual objects. In between VR and AR, many hybrid forms exist under the name of mixed reality (MR), e.g., using a non-transparent HMD display together with a camera attached to the HMD. The user's hand movements can be detected by the camera and virtually projected into the HMD display. Even though the present disclosure relates to VR, AR, or MR, most of the explanations will relate to the domain of VR.

A problem of VR is latency. If the VR viewer is looking into a new direction (rotation/translation), the new content needs to be transmitted with minimum latency to the HMD, such that the viewing experience is in accordance with the motion. Any offset/lag may create motion sickness, which is commonly experienced by VR viewers. Thus, so called "motion to photon latency" (time between motion of HMD and displayed updated content) should be below 20 ms.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and methods that enable improving wireless communication between communication devices in case of fast movement of one of the communication devices.

According to an aspect there is provided a first communication device comprising
  a motion information circuitry configured to obtain motion information representing motion of the first communication device,
  a communication circuitry configured to communicate with a second communication device, and
  a parametrization circuitry configured to set one or more communication parameters of the communication performed by the communication circuitry based on the motion information.

According to a further aspect there is provided a second communication device comprising
  a communication unit configured to receive motion information from a first communication device, the motion information representing motion of the first communication device, and
  a parametrization circuitry configured to set, based on the motion information, one or more communication parameters used for transmitting and/or receiving content.

According to further aspects there are provided corresponding communication methods.

Embodiments are defined in the dependent claims. It shall be understood that the disclosed devices and methods have similar and/or identical further embodiments as defined in the dependent claims and/or disclosed herein.

One of the aspects of the disclosure is that the first and/or second communication device may set (i.e. determine and/or adapt and/or update) their communication parameters (used for communicating with each other, e.g. for any data exchange including the exchange of motion information, other signaling information (channel state feedback, . . . ), for transmitting and/or receiving content) according to the motion information received from the respective other communication device. Further, the communication devices may track channel variations. Fast variations may lead to a mismatch between estimated or predicted channel and the actual channel, resulting in channel instability. Based on the level of channel instability, which can be inferred from the motion information, the number of repetitions of channel estimation within a packet can be decided. Further, the request and negotiations of beamforming and beam tracking parameters (e.g. a beam direction of a beam used for communication and a beam width of the beam used for communication) can be done based on the motion information. Other communication parameters that may be set or adapted according to the motion information may be a physical (PHY) layer parameter, like a precoder setting, an error correction parameter, a modulation parameter, a constellation parameter of a constellation used for modulation, an interleaving parameter, a training sequence parameter, such as its length or its frequency, or it may be a medium access control (MAC) resource.

Another aspect of embodiments of the disclosure is a new transmission scheme, in particular for a WLAN scenario, where motion information (e.g. measurement data of an inertial measurement unit (IMU)) of the first communication device (e.g. a station (STA), in particular an HMD) are sent from the first communication device to a second communication unit (e.g. an access point (AP), in particular a VR-supporting device such as a video game console, or another station as e.g. use in direct device-to-device communication) on a low layer of a hierarchical layer model (that is, on a layer lower than a transport layer). For the WLAN scenario, the disclosure further specifies an optional signaling scheme to transmit such motion information (sometimes also called "motion data") within the MAC layer. This offers two key advantages. On the one hand, this enables enhanced (fast and/or more robust) beam tracking by exploiting motion (including orientation and/or movement) of the first communication device. On the other hand, this provides a low latency interface at the second communication device by providing the motion information directly within a low layer, such as the MAC or PHY layer. This may result in reduced latency between position/orientation changes at the first device and reception of accordingly modified video or image information at the first communication device.

It should be noted that some systems (not necessarily VR applications) may transmit motion information over a low layer according to a hierarchical layer model such as the OSI model, e.g. only over MAC layer. Such systems may not consist of the complete OSI stack, e.g., they may only use PHY and MAC layer (e.g. an IMU connected to a bike wheel, transmitting motion information to a sports device, where such data is stored).

A VR scenario, as one exemplary scenario in which the present disclosure may be applied, requires motion information on upper layers, such as application layer, where the graphic renderer is computing new video based on the user's motion. The present disclosure may in an embodiment, make the motion information available at a lower layer (such as the MAC layer or network layer), without having to wait for its final interpretation on a higher layer (e.g., transport layer, where a packet can only be decoded, after successful reception and assembling of multiple packets from lower layers). This allows for a fast adaptation of the communication in accordance with the motion information as well as a fast bypass from low layer (such as MAC layer or network layer) to the higher layer, on which the information is actually needed (e.g., application layer). Other payload information may be transmitted on a higher layer.

In an UAV (unmanned aerial vehicle) scenario, as another exemplary scenario in which the present disclosure may be applied, the transmit and receive beams of AP, UAV, and end-user may be updated according to motion information of end-user and of the UAV. Providing the motion information at a lower layer, as provided in a preferred embodiment, may thus be advantageous for this scenario as well.

It shall be noted that the present disclosure does not only relate to mmWave communication (and corresponding beam tracking, e.g. according to IMU data), but the proposed solution is more generic and allows for any communication parameter update according to motion information, such as more frequent request or transmission of training sequences in case of high mobility.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIGS. 5A and 5B show exemplary implementations of a motion subfield for exchange of motion information;

FIGS. 6A and 6B show diagrams illustrating beamforming in case the position of STA is unknown to AP;

FIG. 7 shows a diagram illustrating beamforming in case the position of STA is known to AP;

DETAILED DESCRIPTION OF THE EMBODIMENTS

Figure 1:
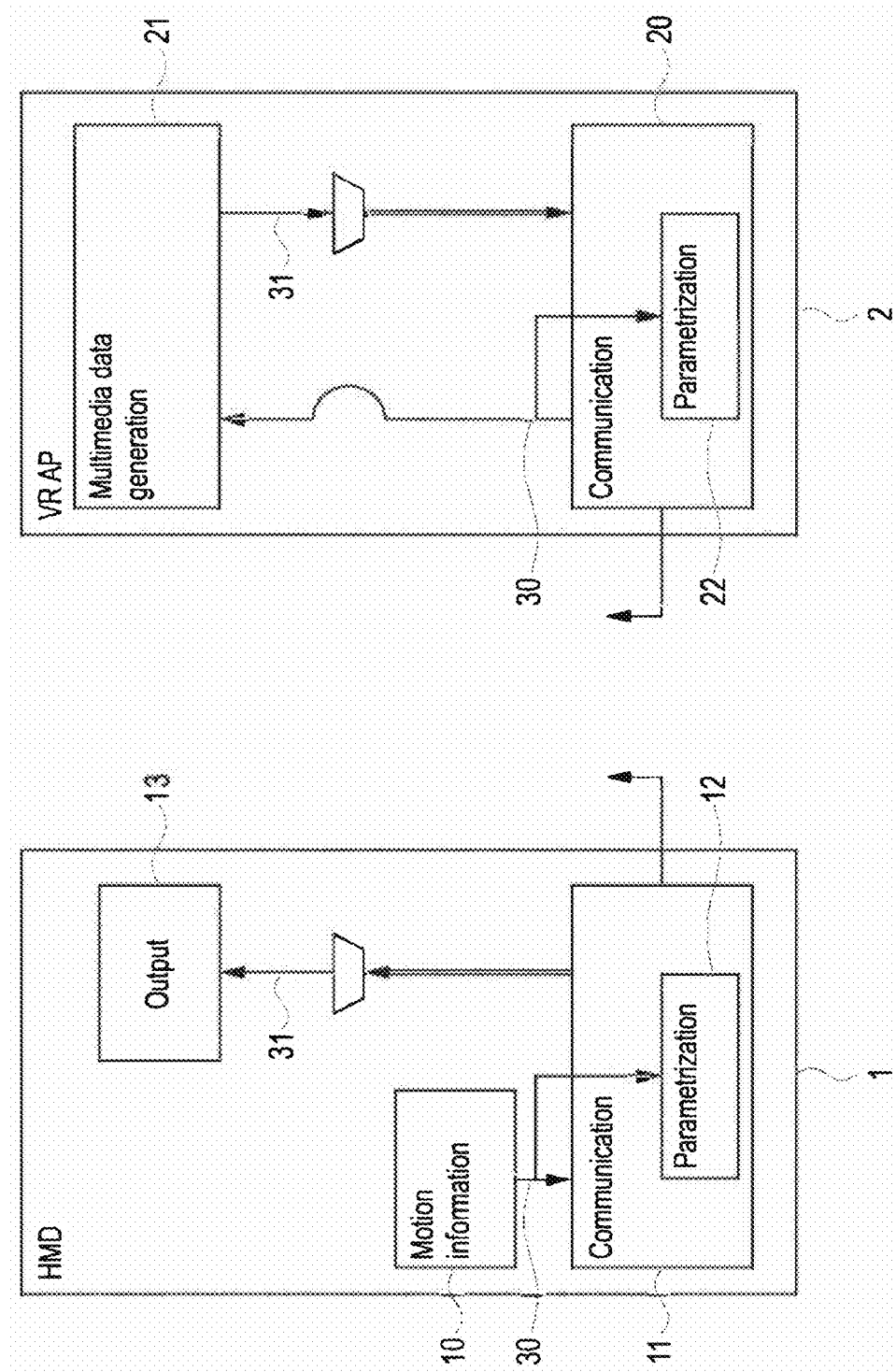
FIG. 1 shows a schematic diagram of a first embodiment of a first communication device and a second communication device according to the present disclosure.

Virtual reality (VR) applications use head-mounted displays (HMD). High data rates are transmitted from the gaming console to the HMD via cable, such as a HDMI cable. Cables however limit the range of motion for the VR user as well as immersive user experience. Some VR applications offer 6DOFs (6 degrees of freedom), meaning that the viewing (and listening) content does not only depend on the direction, the user is looking at (3 dimensions=degrees of freedom), including pitch, yaw, and roll, but also on the position of the HMD (additional 3 dimensions), i.e., location and height in the room (x-, y-, and z-coordinates). To account for user motions, feedback of data from an integrated IMU (inertial measurement unit) is usually provided via the same cable from the HMD to the console. An IMU usually incorporates both an accelerometer sensor (to detect motion in translation) and a gyroscopes sensor (to detect rotation changes). If the video (or audio) content changes only with respect to rotational changes, the device is denoted as 3DOF.

Common 3DOF HMDs for VR are usually cell-phone based solutions (e.g., a smartphone acts as display and is placed into HMD, which includes some additional optics, such as lenses) and provide 360° videos/games, wherein the content is changed according to the 3 rotational DOFs.

6DOF HMDs on the other hand provide new video content, not only based on rotational changes, but also according to the 3-dimensional movements (additional 3DOFs of translations). Usually, no captured 360° videos are displayed, but computer-generated imagery (CGI), such as in games or in visualizations.

Additional motion tracking information could be obtained via camera (e.g. from inside the HMD, using visual SLAM (simultaneous localization and mapping), or from outside the HMD, capturing from some distance the location and orientation of the HMD) or other localization technologies. Such information could also be fed back via (HDMI) cable, or via a wireless link, usually embedded into the remaining uplink data.

Most existing wireless VR solutions currently use mmWave communications, due to the vast amount of bandwidth, allowing several Gbps of data rate for streaming of high quality video. However, such mmWave links are sensitive to fast movements of the communication device or station (STA) which is integrated into the HMD. When the narrow beams used in directive mmWave communication are not aligned properly anymore between access point (AP; e.g., built into the gaming console) and the STA, the link budget may not be sufficient to further support the required data rate. Deployment of multiple antenna arrays on both STA and AP side (so called hybrid MIMO architecture) further worsens the effect of STA movements in case high throughput spatial multiplexing is used (in case, spatial diversity is rather exploited, MIMO could offer more robustness, however). Even if the misalignment of the beams with respect to the new STA position would allow for sufficient link budget, the digital beamforming settings may still result in a mismatch between predicted and observed channel information. Thus, high speed tracking of the analog beams is desirable for mobile mmWave communication (and potentially tracking and correcting also digital precoder settings). Mobility may comprise two components: a translational component (i.e., the STA is moving in x-, y- and/or z-direction) and a rotational component (i.e. the STA is rotating with respect to x-, y- and/or z-axis, called roll, yaw and pitch). For normal movements of human users, translation may be less detrimental (due to limited speed/acceleration capabilities) than rotation (resulting e.g. in self-blockage, when the HMD is rotated by 180°. Other sources of mobility, such as moving objects in the surrounding environment, acting as moving reflectors/scatterers, however, will not be addressed by the present disclosure.

As a result of insufficient analog beam tracking, the video may not be properly transmitted to the HMD (error free and with low latency). Retransmissions for real-time applications cannot solve the issue of data loss, due to low latency constraints.

Another problem is latency: if the VR viewer is looking into a new direction (rotation/translation), the new content needs to be transmitted with minimum latency to the HMD, such that the viewing experience is in accordance with the motion. Any offset/lag will create motion sickness, which is commonly experienced by VR viewers. Thus, so called "motion to photon latency" (time between motion change of HMD and display of updated content) should be as low as possible, in particular below 20 ms.

In common approaches, motion information is sent via an uplink to the console/PC over some protocol, e.g. embedded into a video codec or as payload of IP (internet protocol) packets. The more layers (e.g., with respect to the Open Systems Interconnection model (OSI model; generally known in the art, e.g. from ISO/IEC standard 7498-1:1994)) an information has to pass, the longer the latency, until the data can be interpreted, e.g. after interface output of Layer 5 (presentation layer) or Layer 7 (application layer). Hence, to reduce the time for a communication device to obtain the motion data so that it can be used more quickly for setting one or more communication parameters of the communication, it is in some embodiments proposed to reduce the number of involved layers. This can also be useful to reduce the motion to photon latency.

Using a proprietary protocol for exchange of motion information further makes it difficult to achieve interoperability among HMD vendors. In an extreme case of such a (closed) system, it may not be specified publically how the transmitted motion data has to be interpreted.

It is thus proposed in an embodiment to establish a link between a motion sensory device (also called sensing unit herein; including e.g. an IMU and/or other sensors) and a wireless transceiver (also called communication unit herein), especially for directive mmWave communications. In an embodiment it is further proposed to transmit the (translational and/or rotational) motion information (particularly comprising rotation information indicating rotation and/or orientation; optionally further comprising translational information indicating translation) of the mobile STA (generally called first communication device herein) directly within the WLAN protocol, which defines Layer 1 and Layer 2 of the protocol stack in this case to an AP (generally called second communication device herein). It should be noted that any other wireless protocol, such a cellular 3GPP systems protocol or Bluetooth (which may be sufficient for uplink with small data rate), or any wired protocol, such as Ethernet or USB, may generally also be used.

Referring now to the drawings, wherein like reference numerals designate identical or corresponding parts throughout the several views, FIG. 1 shows a first embodiment of a first communication device 1 and a second communication device 2 according to the present disclosure.

The first communication device 1, e.g. representing a STA integrated in an HMD, comprises a motion information unit 10 that obtains motion information 30 representing motion of the first communication device 1. The motion information unit 10 may comprise a sensing unit (e.g. an IMU sensor) that senses motion of the first communication device 1 and generates motion information 30 representing the sensed motion. In other embodiments the motion information unit 10 may comprise an interface (e.g. a Bluetooth or WLAN interface, preferably operating in non-mmWave bands such as 2.4 or 5 GHz) that receives or retrieves motion information from an external sensor. For instance, an HMD may track its motion not directly, but via an external device, e.g. an external 3D camera or other motion tracking means.

A communication unit 11 (e.g. a WLAN or Bluetooth transceiver) communicates with a second communication device 2. For instance, the motion information 30 may be transmitted to the second communication device 2, which, in an embodiment, may be done within a layer of a hierarchical layer model (in particular an OSI model) lower than a transport layer, in particular in a physical layer or a MAC layer (i.e., the motion information 30 may be transmitted in this low layer directly end-to-end from the first communication device 1 to the second communication device 2. Generally, however, the motion information 30 may be transmitted in any other way to the second communication device 2.

A parametrization unit 12 sets one or more communication parameters of the communication performed by the communication unit 11 based on the motion information 30.

The parametrization unit 12 (e.g. a processor or other computing means implemented in hard- and/or software) may be configured to set one or more of a physical layer parameter, a precoder setting, an error correction parameter, a modulation parameter, a constellation parameter of a constellation used for modulation, an interleaving parameter, a training sequence frequency, a medium access control, MAC, resource, a beam direction of a beam used for communication, and a beam width of the beam used for communication.

As an example, the parametrization unit 12 may set the beam width to a wider beam width, if the motion information indicates fast movement of the HMD device 1. By doing so, the likelihood is reduced that the connection between transmitter and receiver is lost due to steering the beam into a wrong direction. This is achieved at the cost of potentially reduced array gain of beamforming. Other examples, as explained later, will correct the beam direction in accordance with the motion to achieve precise tracking. In general, more robust communication parameters (e.g., FEC coding, modulation, interleaving, . . . ) may be set by the parametrization unit 12, when motion is fast (resulting in unpredictable channels, which could introduce severe communication errors) and vice versa.

As another example PHY protocol data units (PPDUs) repetition may be applied. When the VR STA detects it is in motion of a level larger than a certain threshold it can start a mode in which, packet transmission is duplicated and sent over (subsequently or in parallel (spatial multiplexing MIMO)) several beams spanning a predicted sector/neighboring sector. Similarly, based on motion information the access point or Wireless Network Controller (also called controller hereafter) can initiate a mode in which transmission is sent over several beams spanning a predicted sector or sectors.

In a further example (used in addition or as alternative), a VR/drone STA might change the used MCS (modulation and coding scheme) to a lower number (i.e., more robust MCS), if it detects its motion and thus allows the other STA/AP to decode the PPDU despite misalignment of beams. This PPDU mode adaptation can be used as an alternative to PPDU repetition or in addition to it.

In a further example antenna weight vector (AWV) changes within the preamble may be provided. For instance, motion Information may be used by the service management entity (SME) to trigger a passive RX beam measurement and realignment, which if successful may lead to changing the RX beam. This beam (or beams in case of MIMO) can be further used in transmission towards the other STA. However, since the parameters of the link may have significantly changed, several precautions can be taken for ensuring reliability.

For example, the transmission with the new beam can be performed with more stable estimation sequences, which allow the receiver to change and select best RX AWV. The channel estimation sequence can be formed of several segments being repeated, and within each segment the STA is allowed to change its beam, such that RX beam is realigned directly before packet decoding and not at the end of the previous frame. Best RX beam is used for the rest of the packet. An alternative is to precede the transmission of the first packet after a beam change by a directional beam training frame, e.g. a BRP frame with several training fields, to allow for finding the best RX AWV to receive the packet. This is then followed within short interval by the data packet.

In another embodiment, based on motion information, location tracking can be enabled in a multiple AP scenario. This would allow for possibly fast handovers or allow for neighboring APs to allocate possible resource units for the VR STA (or for a UAV/drone moving between infrastructure APs) to associate. This may require one or more of the following changes.

In the VR/drone case, the InMotion (flag from location tracking) should be activated not only by translation motions but also by rotation (pitch, roll, yaw).

To enable location tracking or fast beam adaptation, a burst of Location Notification Frames should be sent at regular intervals, as indicated by the AP or by a master AP, in several directions, preferably with training units attached, to allow neighboring APs to train their beams on the various TRNs. Additionally, they may contain the motion information to allow the APs to reduce the training overhead, i.e., number of beams/sectors to be trained, number of timeslots to be used/type of training required (transmit and/or receive).

In a practical implementation, a master AP may be required to schedule the intervals in which frames for tracking with motion information are sent to the one or more APs or individual APs may indicate time intervals in which these may receive these types of frame. This may be used to reduce the overhead of control/beam training messages over the air.

If beacons from multiple APs are heard, the RSSI information for the best beams should be included in the location track notification frames.

Upon request of VRMotionTrk from a VR STA or Drone STA, a VR/Drone STA may receive an indication of the schedule of the neighboring APs beacon transmission, which are relevant for the current position, given the motion information.

Based on motion information, an AP can further send VR Motion Notification frames to neighboring APs, having as parameters the location and motion information, in order to increase the probability that the VR STA is received by at least one of them. Additionally, such a frame can request neighboring APs to schedule a beacon transmission (or transmission of several control frames, containing at least BSS information), covering at least the angle sector corresponding to the new VR STA and schedule listening times corresponding to the VRNotificationFrames.

Motion information can be sent over a different band (out-of-band) than the one in which the communication takes place (e.g., can be sent over sub 7 GHz band).

In an embodiment the first communication device 1 may further comprise an output interface 13 that is able to receive any kind of multimedia data 31 comprising information for perception by a user, such as video data, image data, audio signals, force feedback (e.g., vibrations in controller or game suits (such as smart gloves)), artificial smell, odor, etc. The output interface may thus be configured to use the received multimedia data and convert it into a corresponding "signal" (e.g., visual signal, sound, smell, etc.) that can be perceived by a user's sense. The output interface 13 may thus e.g. comprise a display that displays video data, e.g. a display integrated into an HMD device. The multimedia data 31 may thus comprise video data that is received from the second communication device 2 as payload, for instance in response to the transmission of the motion information 30. In other words, the payload information contained within a frame sent in response to the one with the motion subelement may contain video data that e.g. depends on the position inferred from the motion information.

The second communication device 2, e.g. representing an AP integrated into a gaming console (or, more generally, a virtual, augmented, or mixed reality-supporting device) or representing another STA in direct device-to-device communication with the first communication device 1, comprises a communication unit 20 (e.g. a WLAN or Bluetooth transceiver) that receives motion information 30 from the first communication device 1. Further, a parametrization unit 22 (e.g. a processor or other computing means implemented in hard- and/or software) sets, based on the motion information, one or more communication parameters used for transmitting and/or receiving content.

The motion information 30 is preferably not embedded in the payload of a signal, which can only be interpreted at receiver side after assembling the packets on a higher layer, but rather the motion information 30 is preferably received on a lower layer (below transport layer), where it can readily interpreted by the second communication device 2. Generally, however, the motion information 30 may be received in any other way from the first communication device 1.

The second communication device 2 may further comprise a multimedia generation unit 21 configured to generate multimedia data (in the sense as described above) based on the motion information. In an embodiment the multimedia generation unit 21 may comprise a rendering unit (e.g. an image processor or video codec) that renders video and/or audio and/or other data (such as force feedback for haptic feedback) based on the motion information 30. The generated multimedia data 31 (e.g. the rendered video data) are then transmitted (as payload data) to the first communication device 1 for output by the output interface 13 (e.g. for display on a display).

More generally, the first communication device 1 and/or the second communication device 2 may adapt one or more communication parameters or content according to the motion information 30 received from the respective other communication device. For instance, an AP (not necessarily operating in mmWave bands) may request a channel estimation if it realizes that the STA moves too fast. Hence, the second communication device 2 generally reacts to the transmission of motion information 30 from the first communication device 1 by generating and transmitting back adapted information to the first communication device 1. In particular, based on the motion information, an AP or STA may request from its communication counterpart, PHY protocol data units (PPDUs) sent with channel estimation sequences, repeated within the packet to allow the other communication device to track the channel variations. Based on the level of channel instability, which can be inferred from the motion information, the number of such repetitions of the channel estimation within the packet can be decided. Alternatively, for mmWave STAs, the request and negotiations of beamforming and beam-tracking parameters can be done based on the motion information.

Figure 2:
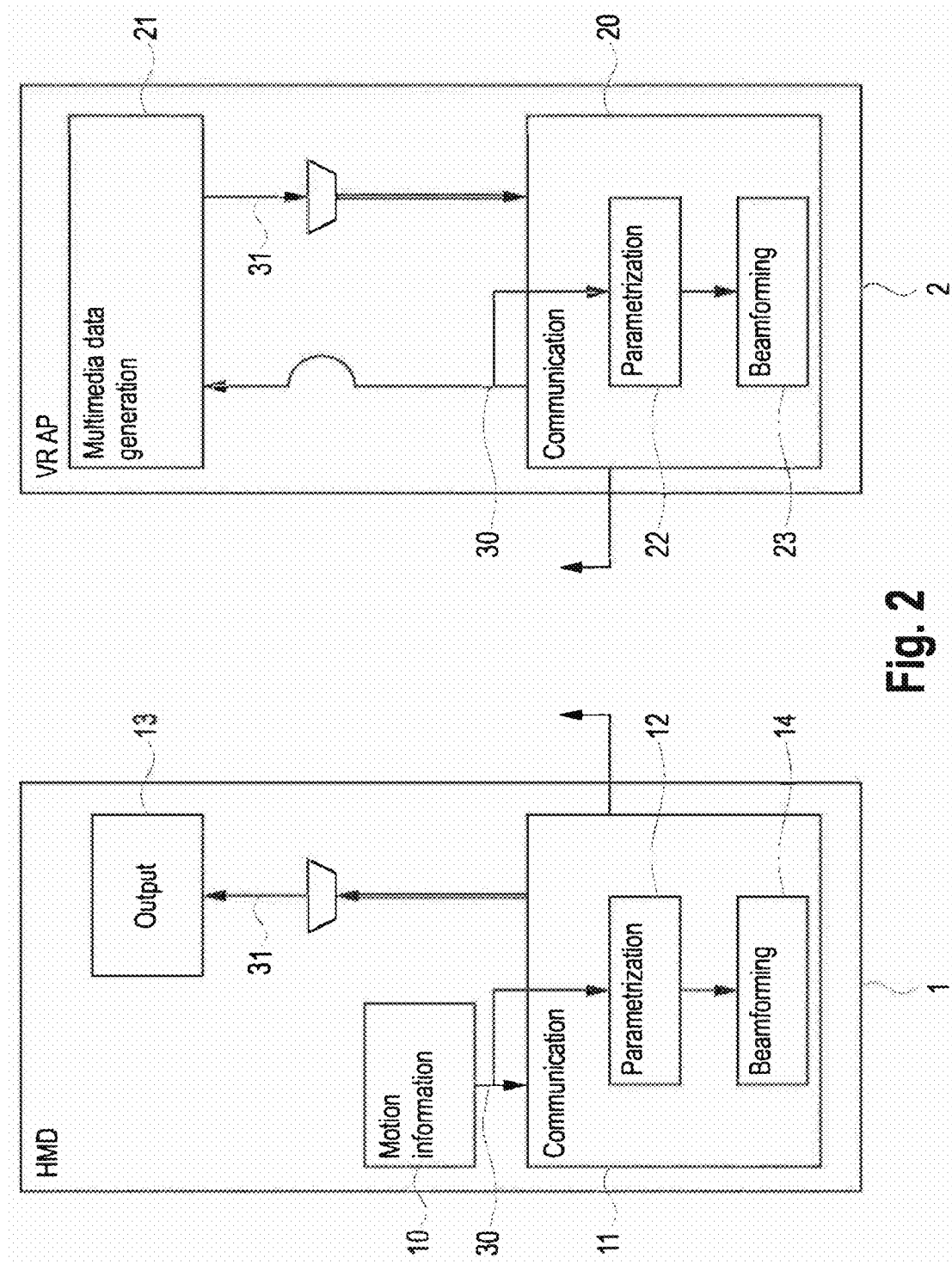
FIG. 2 shows a schematic diagram of a second embodiment of a first communication device and a second communication device according to the present disclosure.

FIG. 2 shows a second embodiment of a first communication device 1 and a second communication device 2 according to the present disclosure. Different from the first embodiment illustrated in FIG. 1, the first communication device 1 additionally comprises a beamforming unit 14 and the second communication device 2 additionally comprises a beamforming unit 23.

The beamforming unit 14 performs beamforming and/or beam tracking based on the motion information 30. Further, the beamforming unit 14 may predict a future position of the first communication device based on the motion information 30 and/or may adapt the direction and/or width of the beam based on the motion information and/or the predicted future position. Similarly, the beamforming unit 23 performs beamforming and/or beam tracking based on the motion information 30 to form a beam for use by the communication unit 20 to receive the motion information and/or to transmit payload data (the double arrow indicating that the image information is "encapsulated" and can no longer be interpreted directly). The beamforming unit 20 may further predict a future position of the first communication unit based on the motion information and/or may adapt the direction and/or width of the beam based on the motion information and/or the predicted future position. Further, for mmWave STAs, the request and negotiations of beamforming and beam-tracking parameters may be done based on the motion information.

In an embodiment both translation and rotation are signaled as motion information. Translational information may be signalled as acceleration as opposed to speed (acceleration being the derivative of speed), because IMUs output acceleration due to measurements of inertia forces. Often, IMUs output translation with respect to acceleration of gravity g (g about 9.8 m/s$^2$ on earth), e.g. acceleration in x-direction being 2.4 g. As for rotation, an IMU usually outputs angular velocities (angular speed) in degree per second (dps) (or in radiants per second) from a gyroscope.

Figure 3:
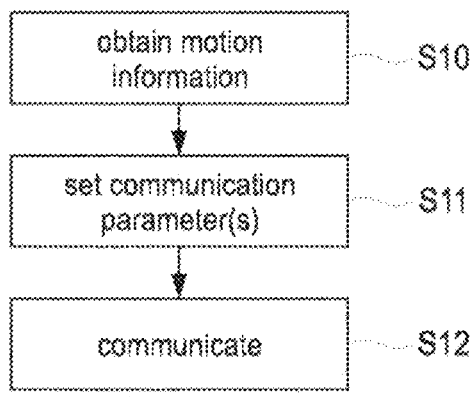
FIG. 3 shows a flow chart of an embodiment of a first communication method according to the present disclosure.

FIG. 3 shows a flow chart of an embodiment of a first communication method according to the present disclosure, which method is particularly configured to be performed by the first communication device 1. In a first step S10 motion information representing motion of the first communication device 1 is obtained. In a second step S11 one or more communication parameters of the communication are set based on the motion information. In a third step S12 the first communication device 1 communicates with the second communication device 2.

Figure 4:
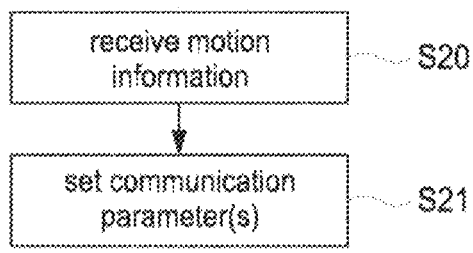
FIG. 4 shows a flow chart of an embodiment of a second communication method according to the present disclosure.

FIG. 4 shows a flow chart of an embodiment of a second communication method according to the present disclosure, which method is particularly configured to be performed by the second communication device 2. This method comprises the first step S20 of receiving motion information from a first communication device, the motion information representing motion of the first communication device. In a second step S21, based on the motion information, one or more communication parameters used for transmitting and/or receiving content are set.

In an embodiment, instead of or in addition to the motion information the second communication device 2 may receive from the first communication device 1 one or more communication parameters and/or a beamforming request requesting the second communication device to perform beamforming training and/or beam tracking and/or beam switching and/or to provide beamforming parameters. These beamforming parameters may include one or more of receive training units on which a responder during the beamforming procedure trains or measures one or more receive beams, or transmit beamforming units in which an initiator of the beamforming training trains one or more transmit beams, or mixed transmit-receive units for mixed training. For TDD type beamforming, beamforming parameters may include one or more of specific transmit sectors, or an angle of departure range and resolution, or receive sectors, or angle of arrival range and resolution that should be tested and time intervals at which the measurements should be made.

FIGS. 5A and 5B show exemplary implementations of the signaling using a motion subelement that may be transmitted from the first communication device 1 to the second communication device 2. In this implementation the following information may be included as motion information (not all of this information must be included; in other embodiments only one or more of these elements are provided as motion information):

Subelement ID is the ID of this subelement (Optional subelement IDs of Location Parameters element from WLAN specification)

Length is the length of this subelement in octets

Linear Scale defines the acceleration full-scale selection, 2 bit (00: ±2 g; 01: ±16 g, 10: ±4 g; 11: ±8 g)

Rotation Scale defines gyroscope full-scale selection, 2 bit (00: 250 dps; 01: 500 dps; 10: 1000 dps; 11: 2000 dps)

Linear acceleration X-axis 16 bit, two's complement

Linear acceleration Y-axis 16 bit, two's complement

Linear acceleration Z-axis 16 bit, two's complement

Angular rate pitch (transverse axis) 16 bit, two's complement

Angular rate roll (longitudinal axis) 16 bit, two's complement

Angular rate yaw (vertical axis) 16 bit, two's complement

Left eye horizontal position 16 bit, two's complement

Left eye vertical position 16 bit, two's complement

Right eye horizontal position 16 bit, two's complement

Right eye vertical position 16 bit, two's complement

Reserved bits for eye tracking, such as pupil sizes, blinks, saccades

Reserved bits are for future use and to guarantee that the length of the subelement is a multiple of 8 bits.

Generally, the motion information can be included into a MAC frame, in which case it may contain the information explained above, but it can also be a primitive residing in a management entity which controls the MAC and/or PHY layer.

Some IMUs have an integrated processor, which allows filtering. Such processors may also estimate the z-direction by detecting the center of gravity towards the earth. But usually, only (unfiltered) raw values are output on a periodic time base (even, if no movement was detected). Another unit may trigger, if motion was detected and only then transmit the IMU data. Further, some sensor fusion may be implemented, in which additional sensors, such as pressure sensor (for absolute height detection) or magnetic sensor (for (outdoor) detection of North direction).

This new subelement could become one new option of the location parameters. The name for this subelement could be "6DOF motion subelement", referring to the 6 degrees of freedom (DOFs), described by translation (three DOFs) and rotation (another three DOFs).

Further implementations for this subelement may include a Motion Indicator Field to signal, when movement was detected. Feedback of IMU data may either be based on periodic transmissions or may be event-triggered (if a certain acceleration/rotation speed threshold is exceeded). If this flag signals that no motion was detected, then there is no need to signal translation and rotation at all. This flag could also signal, if only rotation or if only translation is detected, allowing to skip the other information (translation or rotation, respectively). If translation velocities remain constant, then another flag could signal this as well (since acceleration would be 0), again allowing to skip the translation information.

IMU or other motion data could be transmitted either in its raw form or filtered. Filtering can be applied on several sides, e.g., inside the IMU processor (often optional), some dedicated filtering block (between the IMU and the STA), at the AP side (at some dedicated filtering block) or at an upper processing layer. Data could be fed back either periodically or event triggered. The uplink of such 6DOF data should follow some Quality of Service/Experience (QoS/QoE) levels, such that a maximum (worst-case) latency is not exceeded.

It should be noted that the fed back 6DOF motion data could further include information about the viewer's eyes position: several VR applications consider so called "foveated rendering", in which high resolution of video (at high bit rate) content is only displayed at the focused field of view (center of the eye=fovea with high density of cones, about 200 times higher compared with peripheral view). Eye tracking is required to detect the eye position, e.g., via infrared imaging (invisible IR transmitted towards eye, and captured in camera, all located inside the HMD). The position of the eye inside the 3D video frame could be fed back exactly (in terms of pixel location) or only relatively (e.g., movement to upper left, . . . ), which would require some prior normalization/calibration.

The eyes' position can be exploited in the rendering process, e.g., for calculating new images, considering the intended focus/depth inside the scene. In addition, the concept of foveated rendering allows low resolution video transfer outside of the fovea (where the eye is focusing), while only in a small area around the focus point, high resolution video is transmitted. When it comes to eye movements, it has to be differentiated between intended movements of the focus point and unintended ones. A prominent uncontrollable movement of the eyes is called saccade, which is a rapid movement between two fixation points. Further, eye tracking devices may also feedback the pupil's diameter, which is an indication of the state of the user (arousal, boredom, . . . ).

As illustrated above, conventionally motion information is transmitted end-to-end over a higher layer such as application layer. At the transmitter side (the first communication device 1), the motion information is traversing all lower layers from the hierarchical model, usually resulting in different segmentation of the packets. As an example, IMU data may be split into several MAC protocol data units (MPDUs) and further sent into one or more PHY protocol data units (PPDUs). At the receiver side (the second communication device 2), the operations are reversed. As a consequence of packet segmentation, the higher layer can only interpret the motion information, once all segments have been received, thus introducing latency. Further, while conventionally the motion information 30 is embedded in payload on a higher layer, according to the present disclosure the motion information 30 is embedded in a layer below the transport layer such as in the MAC layer or physical layer and the first and second communication devices 1 and 2 each comprise a corresponding low layer interface. At this interface, the motion information can be readily interpreted.

Embodiments of the disclosure provide one or more advantages: One advantage is that the motion information of the STA can be made accessible by connected units (e.g. graphic card via further connections) of the AP in such a way that faster access to such information is made possible for the AP. Further, the motion information of the STA can be used at the AP to allow for fast and reliable adjustment of communication parameters, such as fast beam tracking, e.g., within the WLAN protocol, which only covers PHY and MAC layer by embedding the motion information in the MAC interface of the 802.11 protocol to make it accessible at the communication unit of the AP.

Especially for mmWave communication, fast beam tracking is preferred to maintain high throughput with high reliability. Information about the movement (e.g., in 6DOFs) of the STA can be exploited at the AP to correct the beams (analog and/or digital) either directly (exact calculation of new position based on some prior position knowledge and based on motion information) or indirectly (e.g., by estimating the new search space for beam refinement based on magnitudes of motion information (i.e., if there are large values a larger search space is used and vice versa).

A simple and straightforward way to indirectly exploit motion information is as follows: if both rotation and acceleration would indicate a stationary situation (rotation=0 in all 3 dimensions and acceleration=g, towards the center of gravity of the earth; assuming that absolutely constant speeds cannot be realized over a long time in practice (with friction and required re-acceleration)), in such static case, no beam tracking is required, once the established beams allow for sufficient data rate and reliability. On the contrary, if rotation and/or acceleration exceed high magnitudes (i.e., some predefined threshold values), the AP is alarmed to update beams. The higher the magnitudes, the larger the search space should be (e.g., only checking for neighboring beam sectors as new alternatives, in case the magnitudes are large, but not too large; corresponding thresholds are subject to optimizations).

So far, it has been assumed that the AP has no information about the absolute position of the STA (or even no relative position with respect to its own position and orientation). If such additional information is available at the AP (e.g., by applying fine time measurements (FTM), with or without additional exchange of angular information), more refined beam tracking would be possible, as will be described below.

Usually, motion information is piggybacked to other uplink data, such as game controller commands. It will be transmitted over the wireless LAN interface consisting of PHY and MAC layer, by traversing from higher layer down to MAC and finally PHY layer for physical transmission. The output from MAC layer is then processed over the remaining protocol stack, and the final content (i.e., the motion information) could be made accessible after decomposition at the higher layer. If the 802.11 MAC interface allows accessing the motion information (in standardized form) already on Layer 2, it could allow for faster access (low latency). The motion information is needed at the console (or PC) to compute the new content for upcoming frames. Ideally, the sensing rate of sensing the motion information is higher than the frame rate of the video, e.g. 90 or 120 (video) frames per second (fps).

Further, a standardized interface would ease interoperability with other HMD vendors and allows for use of the information for other applications such as beamforming and/or training.

In the following, different cases will be explained that can appear for mmWave beam tracking, when the AP is integrated into a stationary device (console, PC, . . . ) and the STA is allowed to be moving.

In a first main case, schematically illustrated in FIG. 6, the position of the first communication device (simply called STA 1 in the following) is unknown to the second communication device (simply called AP 2 in the following).

In a first sub-case of the first main case only rotation of STA 1 shall be assumed as schematically illustrated in FIG. 6A. It is assumed that at a particular time $t_0$, mmWave beams 3, 4 (one for transmission, the other for reception) have already been aligned properly to ensure maximum data rate for communication. If the STA 1 is rotating (via any axis) by an angle α, the AP 2 does not need to know the new orientation of the STA 1, but the STA 1 itself needs to correct its beam 4, if the rotation was large (α large enough such that a better beam would be more suitable). Without beam tracking at STA 1, the effective communication channel could possibly not allow for the required data rates (at time $t_1$). The proposed solution implies that there is a link between IMU and communication unit, both located within STA 1, such that IMU data (i.e., the motion information), in a standardized form, can be made accessible to the communication unit of STA 1 for beam correction (even when no signaling to AP 2 is required).

Ideally, the new beam 4' from the STA 1 (to be used in both uplink and downlink in case of reciprocal channel and hardware components) is simply rotated by the inverse angle −α. Feeding the motion information into the WLAN chipset could allow the STA 1 to exploit such knowledge directly. This corrected beam 4' is shown in FIG. 6A at time $t_2$, when the VR experience can continue at a similar quality level.

For 3DOF content tracking, the rotation needs to be signaled to the game console/PC. This rotation information could be signaled inside the proposed 6DOF motion sub-element (as shown in FIG. 5), even though the AP 2 does not need to know this information for the purpose of beam tracking.

In a second sub-case of the first main case only translation of STA 1 shall be assumed as schematically illustrated in FIG. 6B, in which a translation to the right is indicated. Movements are detected from a non-zero acceleration (e.g. accelerating, and then slowing down at the new position). At time $t_1$, beams 3, 4 from both AP 2 and STA 1 would not be aligned properly anymore. Thus, the AP 2 needs to know that the STA 1 was moving in order to correct its beam 3 into corrected beam 3'.

In case the STA 1 is near the AP 2, the movement may be more detrimental than in case the STA 1 is far away from the AP 2 (thus, possibly remaining inside the same beam sector). Since the STA position is not known at AP side, no exact adjustment is possible. However, the acceleration magnitude already hints towards the potential search space for refined beam training: small magnitudes require only searches within the neighboring sectors, while large magnitude of accelerations would indicate that the search space should be extended. After finding the best new beams (e.g. during a beam refinement phase (BRP)), the AP 2 may interpret the new beam direction (if no adjustment was needed or adjustment only to a neighboring sector, even though the acceleration was relatively high, then most likely, the distance between AP and STA was/is large; this could be stored as prior information for next refinement processes, also considering the acceleration direction (e.g., moving towards or away from the AP)).

Translation only requires update of video/audio content, in case of 6DOF applications. In 3DOF applications, the experience will remain unchanged (still watching towards the same direction in the 360° video).

In a third sub-case of the first main case rotation and translation of STA 1 shall be assumed. This case is not illustrated in a separate figure as it is simply a superposition of the previous two sub-cases illustrated in FIGS. 3A and 3B.

In a second main case, schematically illustrated in FIG. 7, the position of STA 1 is known to AP 2. It is particularly assumed that the AP 2 knows the position of the STA 1 either in earth coordinates (and its own position in the same coordinate system) or at least in relative terms (relative to its own position and orientation). This can be accomplished by prior positioning approaches, such as fine time measurement (FTM), angle of arrival (AOA), angle of departure (AOD) measurements or other methods.

In a first sub-case of the second main case only rotation of STA 1 shall be assumed. This is not illustrated in a particular figure. Substantially the same applies that has been explained above with reference to FIG. 6A. The only difference may be that the video content also changes according to the relative position of the STA 1 with respect to the AP 2 (e.g. displaying objects far away (i.e. small), if STA is far from AP and vice versa).

In a second sub-case of the second main case only translation of STA 1 shall be assumed as schematically illustrated in FIG. 7. Now, the new position at time $t_1$ can even be calculated at the AP 2, assuming that the origin of the coordinate system is at the STA position at time $t_0$ (and aligned as shown in FIG. 7). This means, the STA 1 is positioned at time $t_0$ in the origin at $(x, y)=(0, 0)$, and the stationary AP 2 is located at $(x, y)=(0, y_{AP})$, i.e. at a distance $d=y_{AP}$ (the z-component being assumed to be zero in the example). If the STA 1 starts moving directly after time $t_0$ with uniform acceleration $a=(a_x, a_y, a_z)$, e.g. only in x-direction $(a=(a_x, 0, 0))$, the new position at time $t_1$ is $x_1=\frac{1}{2} \cdot a \cdot (t_1-t_0)^2$. The situation at time $t_2 \cong t_1$ is shown on the right hand side of FIG. 7: the "correction angle" β for the AP 2 to steer the new beam 4' can be computed from its distance $d=y_{AP}$ and the new position $x_1$ as $\beta=\arctan(x_1/d)$.

In the first main case, where the STA position is unknown, the new location $x_1$ can also be computed by the AP 2 once the direction of the acceleration is known. Usually, only the z-component (perpendicular to the horizon) can be estimated by the IMU from the static case, where only the gravitation is applying a force on the STA 1. Still, the magnitude of any acceleration allows estimating the spatial deviation after a certain time span, indicating how large the search space for beam refinement should be, as explained above.

Further, feedback of the motion information (in particular the acceleration information) allows predicting the new position as well, even before the new motion information update is fed back. Observing e.g. for a longer period (e.g., several 100 ms) a uniform (i.e., constant) acceleration into one direction allows assuming that the acceleration remains the same for the next time interval. Thus, the beams may already be steered towards the predicted position and only updated in case of a mismatch (when the new motion information is fed back, which contradicts the assumption).

Regarding beamforming further options exist. In an embodiment a beamforming or beam tracking protocol can be triggered by the motion information, if this motion information is transmitted from a service management entity (SME) (of the first communication device 1) to the MAC (of the first communication device 1). Further, beamforming parameters such as start, number of sectors, sector list, number of angles, angle list to be tested can be negotiated between the management entities of the two communication devices and only then start a transmission. The first communication device 1 may request the amount of receive training that it requires from the second communication device 2 (i.e., the training units in which the first communication device 1 will change its beam) based on the indication inside the motion information (without requiring communication between the SMEs). Still further, the first communication device 1 may transmit the motion information together with training requests (the information as explained above) to the second communication device 2 to allow the second communication device 2 to decide which transmit beams to use during the training/tracking. The motion information may then be sent in the beam refinement packets in this case, SME involvement is not required in this case. Even further, the first communication device 1 may transmit an estimate of its position (based on the IMU data) to the second communication device together with the training/tracking request to allow the second communication device to decide which beams to use during training/tracking, which may be sent in regular beam training packets.

The beam refinement packets may be in BRP (beam refinement phase) frames, or in announce frames, or in a control trailer attached to the packet and carrying control information, or as a control frame aggregated with the data frame. Alternatively, the motion information can be sent over a different band than the one in which the beamformed communication takes place.

In this context it is noted that beam refinement packets are directional frames that are used to request and enable beam training. They contain the necessary parameters for the training, e.g. the number of sectors to be used, type of training to be performed (e.g., transmit/receive/mixed), type of feedback required and also the training units to allow the stations to measure the signal quality on different beam combinations. Announce frames are management frames sending control information. Control trailers are short control frames that are appended to packets and carry information to allow e.g., fast link adaptation.

It should be noted that, even though the preceding description mainly relates to VR, the above can be applied to AR or MR in analogy. More generally, the disclosure also relates to wireless communication with mobile devices, whose location can be exploited. As an example, a wireless backhaul may be established with unmanned aerial vehicles (UAVs), which bridges the distance between an end-user (using an STA) and an AP. The UAV may change its position to optimize coverage for the end-user. Also, balloons with WLAN equipment could create a wireless backhaul or a local hotspot. Another scenario includes only a mobile UAV which is controlled via a wireless link using WLAN or other standards.

In an UAV scenario, as another exemplary scenario in which the present disclosure may be applied, the transmit and receive beams of AP, UAV and end-user may be updated according to motion information of end-user and of the UAV. Providing the motion information at a lower layer may thus be advantageous for this scenario as well.

The motion information may make tracking or training unnecessary since the second communication device can adapt parameters perfectly based on motion information and can hence determine which transmit beams to use during beamforming and/or beam tracking and/or regular transmission.

In the following exemplary implementation details of the motion-based beamforming and directional communication will be described.

Figure 8:
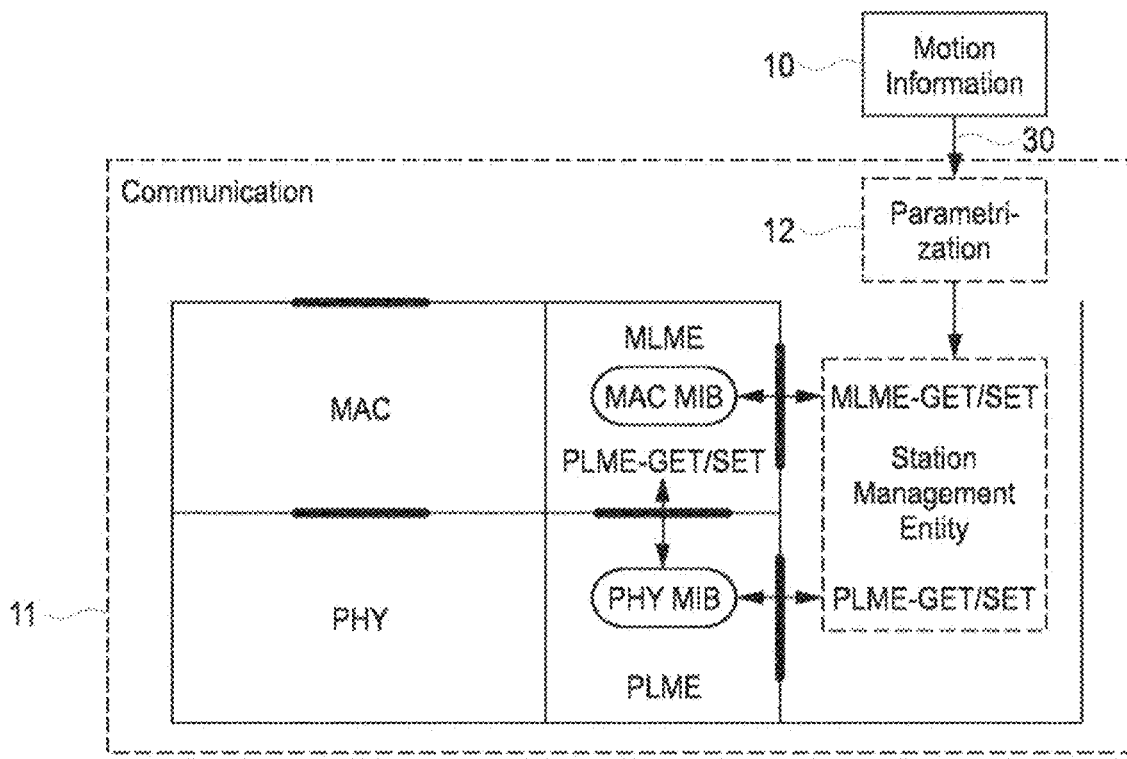
FIG. 8 shows an exemplary implementation of the interfaces and the management entities for PHY and MAC.

FIG. 8 shows an embodiment of the disclosed solution, in which the relation between PHY, MAC and corresponding interfaces, in particular MAC sublayer management entity (MLME) is shown. The interfaces (bold lines), in particular the management entities for PHY and MAC (PLME and MLME, respectively) are controlled by the Station Management Entity (SME), which is a separate management plane, allowing to set, get or modify primitives. As shown in FIG. 1 the communication unit 11 accepts motion information 10, triggering changes of parameters (in the parametrization unit 12). A possible realization thereof may be as follows.

Figure 9:
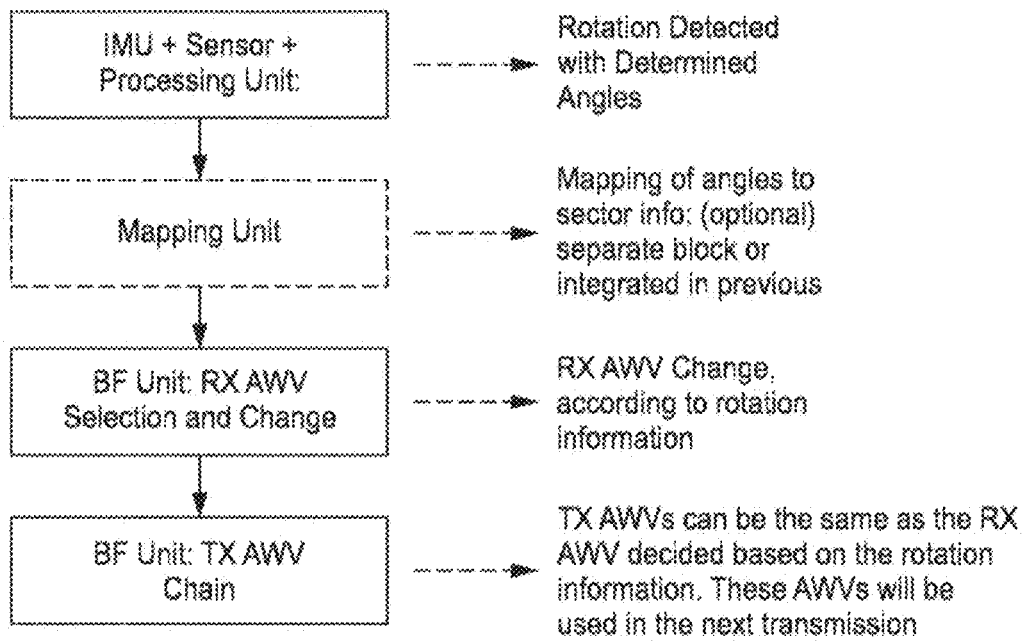
FIG. 9 shows an exemplary implementation of how to use IMU data at the VR/drone STA to infer receive beams to be used, followed by the transmit beams.

Based on IMU information, RX beam measurement for specific sectors corresponding to the rotation/translation sensor information is triggered. In FIG. 9, it is shown how to use the IMU data at a VR/drone STA to infer receive beamforming parameters to be used to maintain alignment to an AP. More specifically, IMU data (together with currently used beam information) can be mapped to angles or sectors information which will be sent as parameters by the management entity (specifically the MAC sublayer management entity (MLME) to the MAC. The Mapping Unit can be seen as one embodiment of the parametrization unit 12 for modifying one or more beam parameters. Upon receipt of this primitive, the MAC triggers the measurement of directional beams/beacons from an AP and instructs the PHY to use for the measurement, RX beams corresponding to the RX sector information which is part of the primitive parameters. Additionally, time stamp information can be correlated with the RX sector information, based on both IMU motion information available from the local sensors as well as information from an AP schedule. In this way, particular RX beams will be used at given time stamps, as instructed by the parameters of the primitive, for the measurement of the directional frames from the AP.

Figure 10:
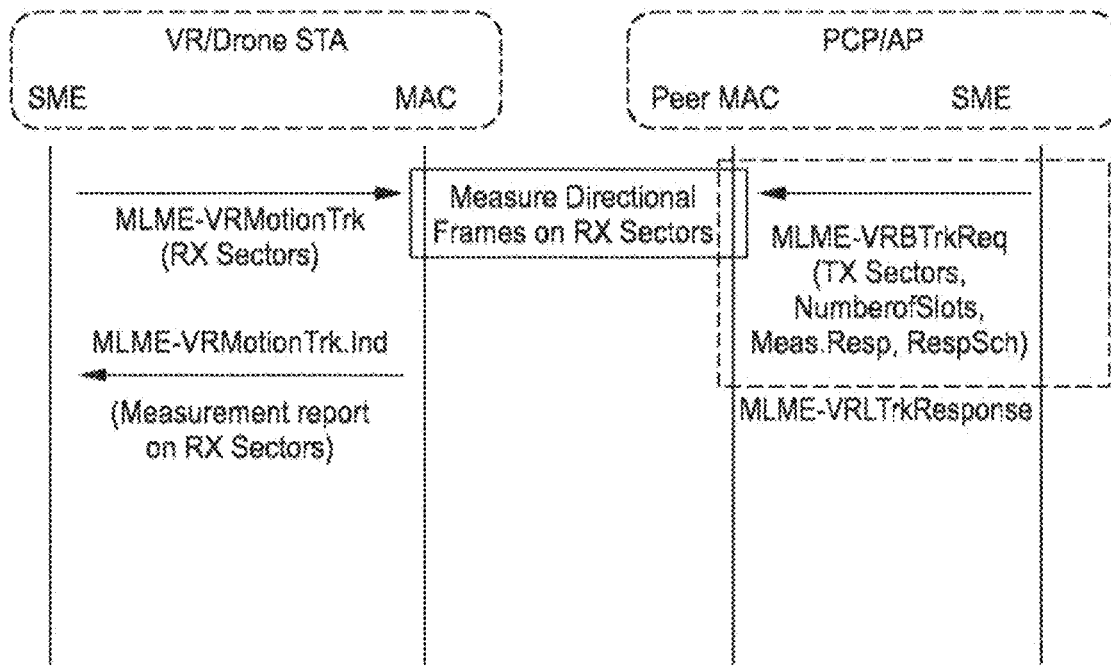
FIG. 10 shows an exemplary implementation of motion information aided beam measurement and realignment.

This primitive and the interworking of the management entity and the MAC of the VR/drone STA are depicted in FIG. 10. Measurement reports for the requested sectors will be reported back to the management entity, which will decide the necessary further actions, e.g., a beam change or a trigger for a beam realignment with the AP. Furthermore, if better receive beams have been found, these can be further used in a follow up transmission to the AP.

When the AP has received the motion information (either from in-band or out-of band messages), it can use this to schedule directional beam transmissions, which allows for training and data transmission with minimum training overhead. For example, upon knowledge of the motion info of the VR/drone STA, the AP may send directional frames e.g., beacons in the predicted directions (e.g., a subset of directions that would be used without that knowledge), to allow the recipient to constantly train its reception beams. The parameters of the directional frame transmission e.g., the transmit directions, the frequency with which this transmission occurs, the type of information contained, is adapted based on the motion information, such that it allows the VR/drone STA to perform tracking and, when necessary, receive updated data (based on new position) without occupying the medium with too much control information. The transmit sectors in which directional beams should be sent can be inferred from the motion information. Based on the reported speed/acceleration parameters of the VR/drone STA as well as the local schedule information at the AP (when next transmissions are possible), a list of TX sectors/antennas/AWVs is created together with timestamps at which each of them should be tested. Based on the speed as well as uncertainty of measurement, the number of slots for each sector, in which a directional frame is repeated to ensure the reception/receive beam training at the VR/drone STA, can also be created. These parameters are sent as primitives by the management entity of an AP to the MAC, which will then construct directional frames and instruct the PHY to transmit with the required beams at the required timestamps. This primitive is referred to as MLME-VRBTrkReq in FIG. 10.

Figure 11:
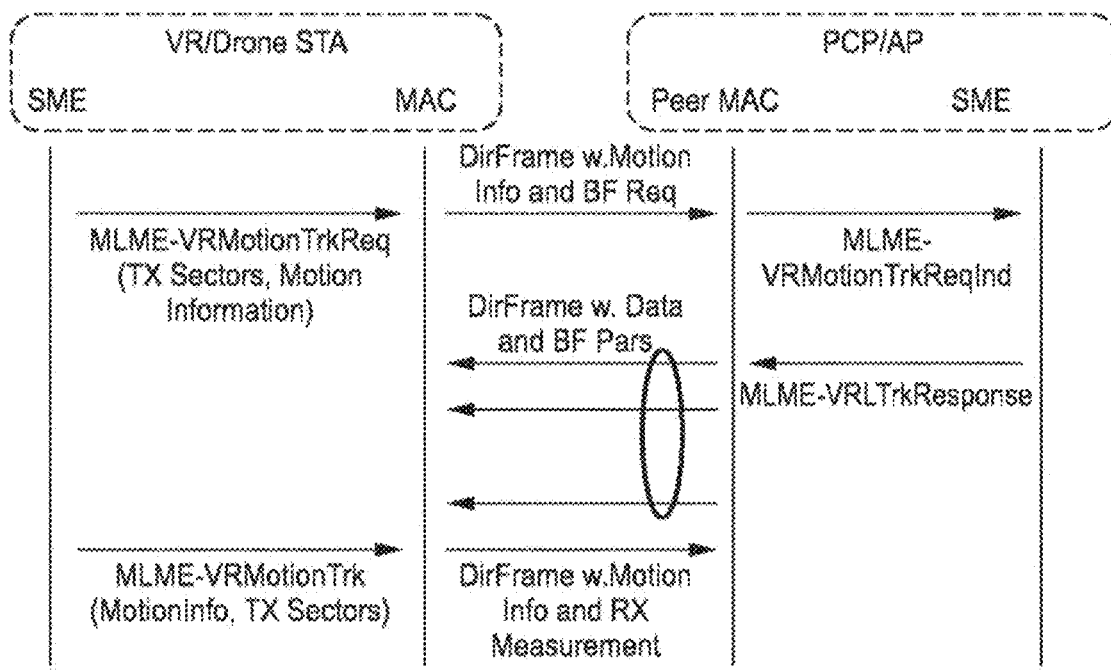
FIG. 11 shows an exemplary implementation of sending motion information in band.

In FIG. 11, the case of in-band transmission of motion information is shown. In this case, the management entity of the VR STA requests the MAC to send directional frames (DirFrame), .g., a BRP frame, or an announce frame containing this information, possibly together with training information or requests. Alternatively, the primitive may instruct the MAC to aggregate some control frame carrying the motion information with data frames and send these together in a PPDU with tracking request and corresponding training units attached. If a beamforming training has occurred before, motion information can be sent together with beamforming feedback information or as part of a control trailer, which is attached to the data packet to give an indication of the future beams to use. This information is forwarded upon receipt of the MAC of the AP to its management entity.

Based on the motion information received by one of the methods described above, the AP will decide upon the action to take, e.g., request a beam track, or a beam change or a reliable transmission with PPDU repetition over several directions and instruct the MAC accordingly. The beam directions to be used are decided by the management entity based on the motion information, i.e., motion information is transformed to sectors in which the beamformed transmission or training should be performed at particular times. The directions and times are then forwarded as parameters to the MAC to create the corresponding frames and instruct the PHY to start the transmission according to the given parameters.

Further, the SME might provide direct access to the received motion information to other entities that are not part of the communication unit included in a second communication device (e.g. the interface 30 shown in FIGS. 1 and 2), allowing e.g. for adaption of image/rendering data as a result of the VR's/Drone's motion/movement or change of position.

MLME-VRTrkResponse primitive from the management entity instructs the MAC to create frames informing the VR/Drone STA which transmit beams are used. Additionally, information, regarding the time stamps at which a response from the STA can be received by the PCP/AP and with which receive beams, is indicated in the MAC frames that are created upon receipt of the primitive. The response from the VR/Drone STA should contain updated motion information and directional measurements for one or more transmit beams, as indicated in the request.

Figure 12:
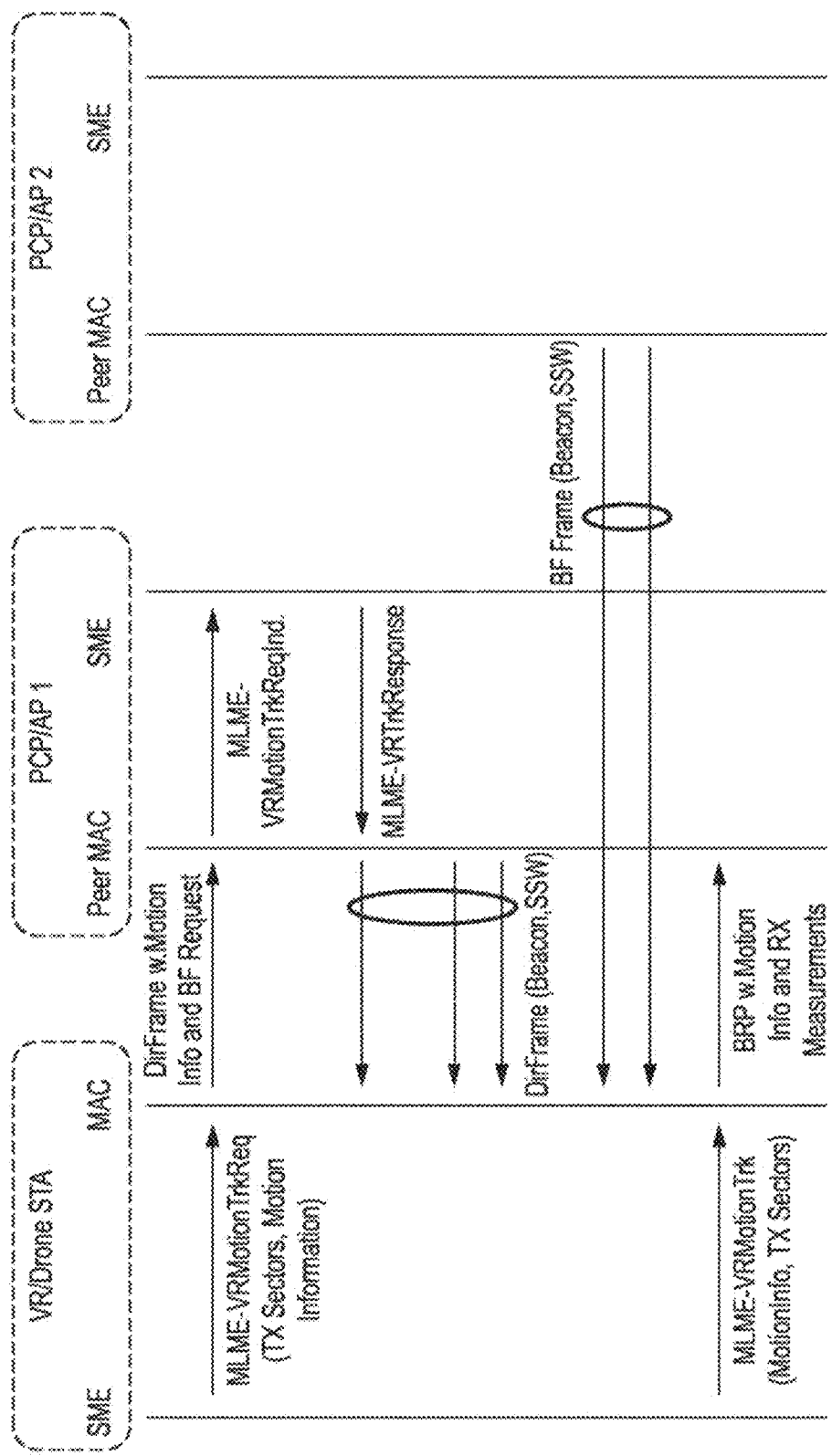
FIG. 12 shows an exemplary implementation of multiple AP training triggered by motion information.

FIG. 12 shows a managed network, in which either a Wireless Network Controller (not shown) or one of the APs is responsible for mobility management. Within a managed network, information regarding transmit and receive periods of multiple APs can be contained within the frames issued by the MAC in response of MLME-VRTrkResponse. Which APs are participating can be decided based on the motion information by a master AP or by a controller. In this case VR/Drone STA may be informed e.g., at which time a beacon transmission from a different AP is expected, such that the former can train beams with this and at which time it may send a response to this e.g., association request. This is shown in FIG. 12.

Figure 13:
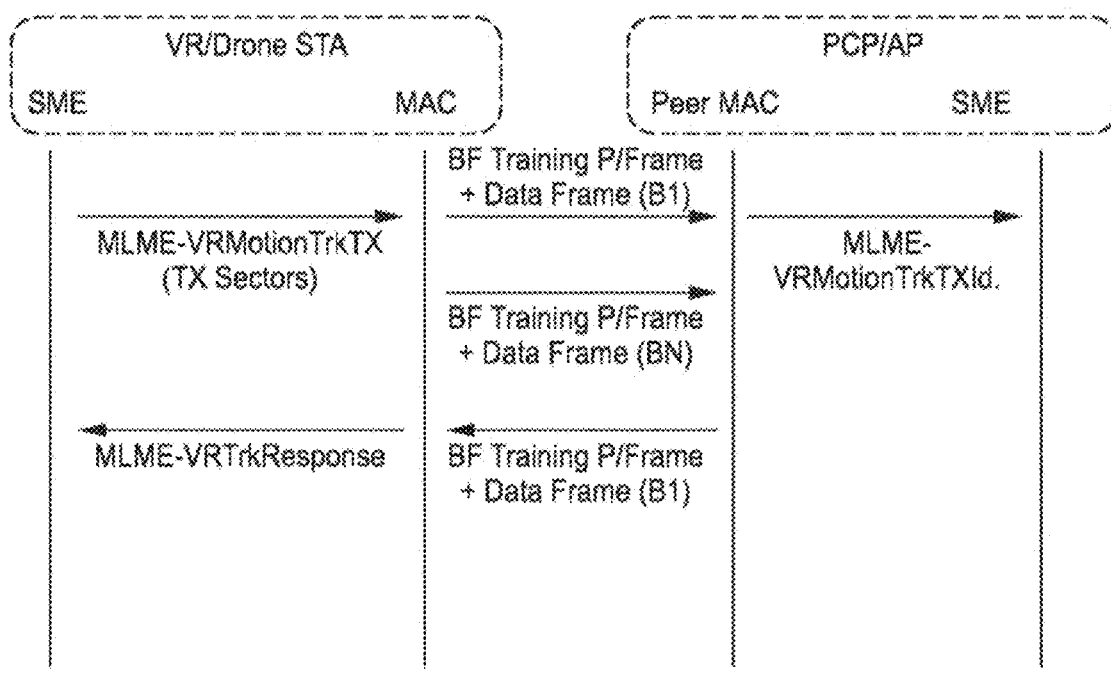
FIG. 13 shows an exemplary implementation of reliable transmission after RX beam change.

If a VR/drone STA detected its motion (InMotion flag), or if after a directional measurement, receive beams have been changed, the parameters for the subsequent transmission to the AP should be accordingly adapted, to allow the latter to realign its beams. This is shown in FIG. 13. Thus in this case data packets can be sent with a repetition of training units to allow the AP to realign its beam. Alternatively, a training packet, sent in several directions indicated by the mapping unit (mapping IMU data to TX beams) can precede the data transmission.

In the foregoing various embodiments have been described for applying the disclosure in various scenarios and applications. The described mobile STA may hereby e.g. be a AR/VR headset (also called HMD) or a drone (also called UAV) or any other arbitrary mobile device, such as a robot or robot arm that is movable in several degrees of freedom (e.g. 6 DOF).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. A first communication device comprising
   a motion information circuitry configured to obtain motion information representing motion of the first communication device,
   a communication circuitry configured to communicate with a second communication device, and
   a parametrization circuitry configured to set one or more communication parameters of the communication performed by the communication circuitry based on the motion information.

2. The first communication device as defined in embodiment 1,
   wherein the one or more communication parameter is one or more of a physical layer parameter, a precoder setting, an error correction parameter, a modulation parameter, a constellation parameter of a constellation used for modulation, an interleaving parameter, a training sequence frequency, a medium access control, MAC, resource, a beam direction of a beam used for communication, and a beam width of the beam used for communication.

3. The first communication device as defined in any preceding embodiment, further comprising a beamforming circuitry configured to perform beamforming and/or beam tracking,
   wherein the parametrization unit is configured adapt the direction and/or width of the beam used for beamforming and/or beam tracking.

4. The first communication device as defined in embodiment 3,
   wherein the beamforming circuitry is configured to perform beamforming and/or beam tracking triggered by reception of the motion information from a service management entity.

5. The first communication device as defined in any preceding embodiment,
   wherein the communication circuitry is configured to transmit, to the second communication device, one or more of
      the motion information,
      one or more communication parameters,
      a beamforming request requesting the second communication device to perform beamforming training and/or beam tracking and/or beam switching and/or to provide beamforming parameters.

6. The first communication device as defined in embodiment 3, 4 or 5,
   wherein the communication circuitry is configured to request the second communication device to provide one or more of a start sector, a number of sectors, a sector list, a number of angles, an angle list to be tested with the second communication device and/or a time schedule of the beamforming transmissions on which the measurements should be performed 7. The first communication device as defined in any preceding embodiment,
   wherein the communication circuitry is configured to request a second communication device to schedule training intervals in which directional frames, in particular containing updated motion information, are exchanged to adapt the beams.

8. The first communication device as defined in any preceding embodiment,
   wherein the beams to be used during directional transmission or reception by the second communication device are selected based on the received motion information.

9. The first communication device as defined in any preceding embodiment,
   wherein the communication circuitry is configured to transmit the motion information together with a beamforming request to the second communication device to allow the second communication device to decide if beamforming training and/or beam tracking and/or beam switching is necessary and, if necessary, which transmit beams to use during beamforming training and/or beam tracking.

10. The first communication device as defined in embodiment 9,
    wherein the communication circuitry is configured to transmit the motion information in beam refinement packets.

11. The first communication device as defined in any preceding embodiment, wherein the communication circuitry is configured to transmit a position estimate to the second communication device together with a beamforming request to allow the second communication device to decide which beams to use during beamforming training or beam tracking, said position estimate indicating an estimate of the absolute or relative position and/or differential components of the position of the first communication device.

12. The first communication device as defined in any preceding embodiment,
wherein the communication circuitry is configured to transmit the motion information to a second communication device within a layer of a hierarchical layer model lower than a transport layer.

13. The first communication device as defined in any preceding embodiment,
wherein the motion information includes one or more of:
linear scale defining acceleration full-scale selection;
rotation scale defining gyroscope full-scale selection;
linear acceleration X-axis;
linear acceleration Y-axis;
linear acceleration Z-axis;
angular rate pitch;
angular rate roll;
angular rate yaw;
left and right eye horizontal position;
left and right eye vertical position;
reserved bits for eye tracking, such as pupil sizes, blinks, saccades; or
wherein the motion information further includes a mapping from one or more of the said parameters to one or more values indicating the degree of channel instability and/or the request to send packets with repetitions of channel estimation sequences within the packet or packets with repetitions of training sequences within or at the end of the packet and number of such repetitions required.

14. The first communication device as defined in embodiment 13,
wherein the parametrization circuitry is configured to map one or more of the parameters included in the motion information to a list of sectors to be used for beamforming or to a list of sectors and corresponding timestamps, said timestamps indicating the time at which a particular sector is to be used during the beamforming training and/or transmission.

15. The first communication device as defined in any preceding embodiment,
wherein the first communication device is a head-mounted display device.

16. A second communication device comprising
a communication circuitry configured to receive motion information from a first communication device, the motion information representing motion of the first communication device, and
a parametrization circuitry configured to set, based on the motion information, one or more communication parameters used for transmitting and/or receiving content.

17. The second communication device as defined in embodiment 16, further comprising a beamforming circuitry configured to perform beamforming and/or beam tracking based on the motion information to form a beam for use by the communication circuitry to receive the motion information and/or to transmit content.

18. The second communication device as defined in embodiment 17,
wherein the beamforming circuitry is configured to adapt the direction and/or width of the beam used for transmitting content based on the motion information.

19. The second communication device as defined in any one of embodiments 16 to 18,
wherein the communication circuitry is configured to receive, from a first communication device, one or more of
one or more communication parameters,
a beamforming request requesting the second communication device to perform beamforming training and/or beam tracking and/or to provide beamforming parameters, and
a training request requesting the amount of receive training units required by the first communication device from the second communication device.

20. The second communication device as defined in any one of embodiments 16 to 19,
wherein the communication circuitry is configured to negotiate beamforming parameters with the first communication device.

21. The second communication device as defined in in any one of embodiments 16 to 20,
wherein the second communication device is a virtual, augmented, or mixed reality device.

22. The second communication device as defined in any one of embodiments 16 to 21,
wherein the communication circuitry is configured to schedule, based on the motion information, transmission of directional frames to allow the first communication device to update its receive and/or transmit beam.

23. The second communication device as defined in any one of embodiments 16 to 22,
wherein the communication circuitry is configured to schedule, based on the motion information time slots in which the first communication device can send directional frames to the second communication, in particular for beam measurement or beam update for determining sectors or angles of arrival to be used.

24. The second communication device as defined in any one of embodiments 16 to 23,
wherein the communication circuitry is configured to inform the first communication device, based on the motion information, of time slots in which the first communication device can send directional frames to neighboring second communication devices or of time slots in which neighboring second communication devices send directional frames, which can be used for beam measurement by the first communication device.

25. The second communication device as defined in embodiments 24,
wherein the communication circuitry is configured to choose neighboring first communication devices based on motion information and to indicate them to the first communication device, optionally together with information regarding the position of the second communication devices or with a list of sectors or angles to be used by the first communication device for transmission and/or reception.

26. The second communication device as defined in any one of embodiments 16 to 25,
wherein the communication circuitry is configured to inform, based on the motion information, a first communication device of scheduled or random access resource units within trigger frames to allow a first communication device in motion, to transmit to the second communication device, to which it is not associated.

27. A first communication method comprising
obtaining motion information representing motion of the first communication device,
setting one or more communication parameters of the communication based on the motion information, and
communicating with a second communication device.

28. A second communication method comprising
receiving motion information from a first communication device, the motion information representing motion of the first communication device, and
setting, based on the motion information, one or more communication parameters used for transmitting and/or receiving content.

29. The first or second communication device or method, wherein the communication relates to wireless communication, in particular mmWave communication or communication in accordance with a IEEE802.11 standard.

The invention claimed is:

1. A first communication device comprising:
motion information circuitry configured to obtain motion information representing motion of the first communication device,
communication circuitry configured to communicate with a second communication device, and
parametrization circuitry configured to set one or more communication parameters of the communication performed by the communication circuitry based on the motion information,
wherein the communication circuitry is configured to transmit the motion information to the second communication device in beam refinement packets within a layer of a hierarchical layer model lower than a transport layer.

2. The first communication device as claimed in claim 1, wherein the one or more communication parameter is one or more of:
a physical layer parameter,
a precoder setting,
an error correction parameter,
a modulation parameter,
a constellation parameter of a constellation used for modulation,
an interleaving parameter,
a training sequence frequency,
a medium access control (MAC) resource,
a beam direction of a beam used for communication, and
a beam width of the beam used for communication.

3. The first communication device as claimed in claim 1, further comprising beamforming circuitry configured to perform at least one of beamforming or beam tracking,
wherein the parametrization circuitry is configured to adapt at least one of a direction or width of a beam used for the at least one of the beamforming or beam tracking.

4. The first communication device as claimed in claim 3, wherein the beamforming circuitry is configured to perform the at least one of the beamforming or beam tracking triggered by reception of the motion information from a service management entity.

5. The first communication device as claimed in claim 1, wherein the communication circuitry is configured to transmit, to the second communication device, one or more of:
the motion information,
one or more communication parameters,
a beamforming request requesting the second communication device to perform at least one of beamforming training, beam tracking, beam switching, or provide beamforming parameters.

6. The first communication device as claimed in claim 3, wherein the communication circuitry is configured to request the second communication device to at least one of provide one or more of a start sector, a number of sectors, a sector list, a number of angles, an angle list to be tested with the second communication device, or provide a time schedule of the beamforming transmissions on which measurements should be performed.

7. The first communication device as claimed in claim 1, wherein the communication circuitry is configured to transmit the motion information together with a beamforming request to the second communication device to allow the second communication device to decide if at least one of beamforming training, beam tracking, or beam switching is necessary and, if necessary, which transmit beams to use during the at least one of the beamforming training or beam tracking.

8. The first communication device as claimed in claim 1, wherein the communication circuitry is configured to transmit a position estimate to the second communication device together with a beamforming request to allow the second communication device to decide which beams to use during beamforming training or beam tracking, said position estimate indicating an estimate of at least one of the absolute or relative position or differential components of the position of the first communication device.

9. The first communication device as claimed in claim 1, wherein the motion information includes one or more of:
linear scale defining acceleration full-scale selection;
rotation scale defining gyroscope full-scale selection;
linear acceleration X-axis;
linear acceleration Y-axis;
linear acceleration Z-axis;
angular rate pitch;
angular rate roll;
angular rate yaw;
left and right eye horizontal position;
left and right eye vertical position;
reserved bits for eye tracking, including pupil sizes, blinks, saccades; or
a mapping from one or more of the said parameters to one or more values indicating a degree of channel instability and the request to send packets with repetitions of channel estimation sequences within the packet or packets with repetitions of training sequences within or at the end of the packet and number of such repetitions required.

10. The first communication device as claimed in claim 1, wherein the first communication device is a head-mounted display device.

11. The first communication device as claimed in claim 1, wherein the layer of the hierarchical layer model lower than the transport layer used to transmit the motion information includes the media access control (MAC) layer.

12. A second communication device comprising:
communication circuitry configured to receive motion information from a first communication device, the motion information representing motion of the first communication device, and parametrization circuitry configured to set, based on the motion information, one or more communication parameters used for one of transmitting or receiving content, wherein the second communication device receives the motion information from the first communication device via beam refinement packets in a layer of a hierarchical layer model lower than a transport layer.

13. The second communication device as claimed in claim 12, further comprising beamforming circuitry configured to perform at least one of beamforming or beam tracking based on the motion information to form a beam for use by the communication circuitry to at least one of receive the motion information or transmit content.

14. The second communication device as claimed in claim 13, wherein the beamforming circuitry is configured to adapt at least one of a direction or width of a beam used for transmitting content based on the motion information.

15. The second communication device as claimed in claim 12, wherein the communication circuitry is configured to receive, from a first communication device, one or more of:
   one or more communication parameters,
   a beamforming request requesting the second communication device to one of perform beamforming training, beam tracking, or provide beamforming parameters, and
   a training request requesting an amount of receive training units required by the first communication device from the second communication device.

16. The second communication device as claimed in claim 12, wherein the communication circuitry is configured to negotiate beamforming parameters with the first communication device.

17. The second communication device as claimed in claim 12, wherein the second communication device is a virtual, augmented, or mixed reality device.

18. A first communication method comprising:
   obtaining motion information representing motion of the first communication device,
   setting one or more communication parameters of the communication based on the motion information,
   communicating with a second communication device using the one or more communication parameters set, and
   transmitting the motion information to the second communication device in beam refinement packets within a layer of a hierarchical layer model lower than a transport layer.

19. A second communication method comprising:
   receiving motion information from a first communication device, the motion information representing motion of the first communication device, and
   setting, based on the motion information, one or more communication parameters used for at least one of transmitting or receiving content,
   wherein the motion information is received from the first communication device via beam refinement packets in a layer of a hierarchical layer model lower than a transport layer.

* * * * *